United States Patent Office 3,608,323
Patented Sept. 28, 1971

3,608,323
NATURAL GAS LIQUEFACTION PROCESS
Claude Salama, Montreal, Quebec, Canada, assignor to Canadian Liquid Air Ltd.-Air Liquide Canada LTEE, Montreal, Quebec, Canada
Filed Nov. 20, 1967, Ser. No. 684,369
Claims priority, application Canada, Jan. 31, 1967, 981,719
Int. Cl. F25j 1/00
U.S. Cl. 62—9
6 Claims

ABSTRACT OF THE DISCLOSURE

The invention relates to a process and apparatus for liquefying natural gas. The gas stream from a main distribution line is divided into two streams. One stream is heated, then expanded through an expansion turbine to be distributed at a lower pressure. The power from the expansion turbine is used to operate a refrigeration system which liquefies the other gas stream.

---

This invention relates to an improved process and apparatus for refrigerating natural gas.

The invention is particularly related to an improved process and apparatus for liquefying natural gas.

Natural gas is transported to a distributing station through a high pressure pipe line. At the distributing station, the pressure of the natural gas is reduced to feed it through distributing mains for consumer use. Some of the gas at the distributing station may be liquefied to store the gas for future use. To liquefy the gas, it has previously been proposed to expand the high pressure gas at the distributing station through an expansion turbine, at low temperatures, to the lower pressure required for the distributing mains. The gas, in expanding to a lower pressure through the turbine, is further cooled and is used as a refrigerant medium to refrigerate and thus liquefy some of the natural gas from the high-pressure line. The power developed at the turbine is used to drive a refrigeration compressor which circulates the refrigerant gas.

However, the process has several disadvantages. In order to prevent the possibility of the low temperature gas from freezing when expanded through the turbine to a lower temperature, all the gas must be passed through a purification unit to remove moisture and carbon dioxide. This requires a large and expensive purification unit to handle the large flow of gas. By way of example, a system required to liquefy two million standard cubic feet per day (MM s.c.f.d.) of natural gas for storage purposes may have to treat a flow of gas through the purification unit in the amount of 40 million standard cubic feet per day (MM s.c.f.d.). The process also is not very efficient. A small power recovery is obtained at the turbine since the gas is at a low temperature in passing therethrough. This results in producing a limited amount of refrigeration. The process further has the disadvantage of not being very flexible in that it is difficult to control the amount of refrigeration required to liquefy varying amounts of gas.

Applicant's invention relates to providing a more efficient, flexible and cheaper process and system for refrigerating natural gas. Preferably, the system is used to liquefy natural gas. The system permits a much smaller purification unit to be used thus effecting a substantial saving in cost. The refrigeration unit can also be reduced in size. The system also permits a variable amount of refrigeration to be produced.

According to the invention, the improved system involves preheating the gas flow being expanded prior to expansion. Since the gas is expanded at higher temperatures, the possibility of its freezing does not exist and therefore it does not have to be purified. Only the small flow of gas being liquefied requires purification, and thus the purification unit can be greatly reduced in size.

The system further provides an independent refrigeration cycle to liquefy the natural gas rather than using the expanded gas as a refrigerant medium. The separate refrigeration cycle is more efficient than the previous method of liquefying the gas using the cooled expanded gas. The separate refrigeration cycle is operated by the increased power obtained from the turbine in expanding the heated gas. The temperature to which the gas is heated can be controlled, and thus the power obtained from the turbine is variable and provides variable refrigeration to liquefy varying amounts of gas.

The invention will be described in more detail having reference to the accompanying drawings, in which.

Figure 1:
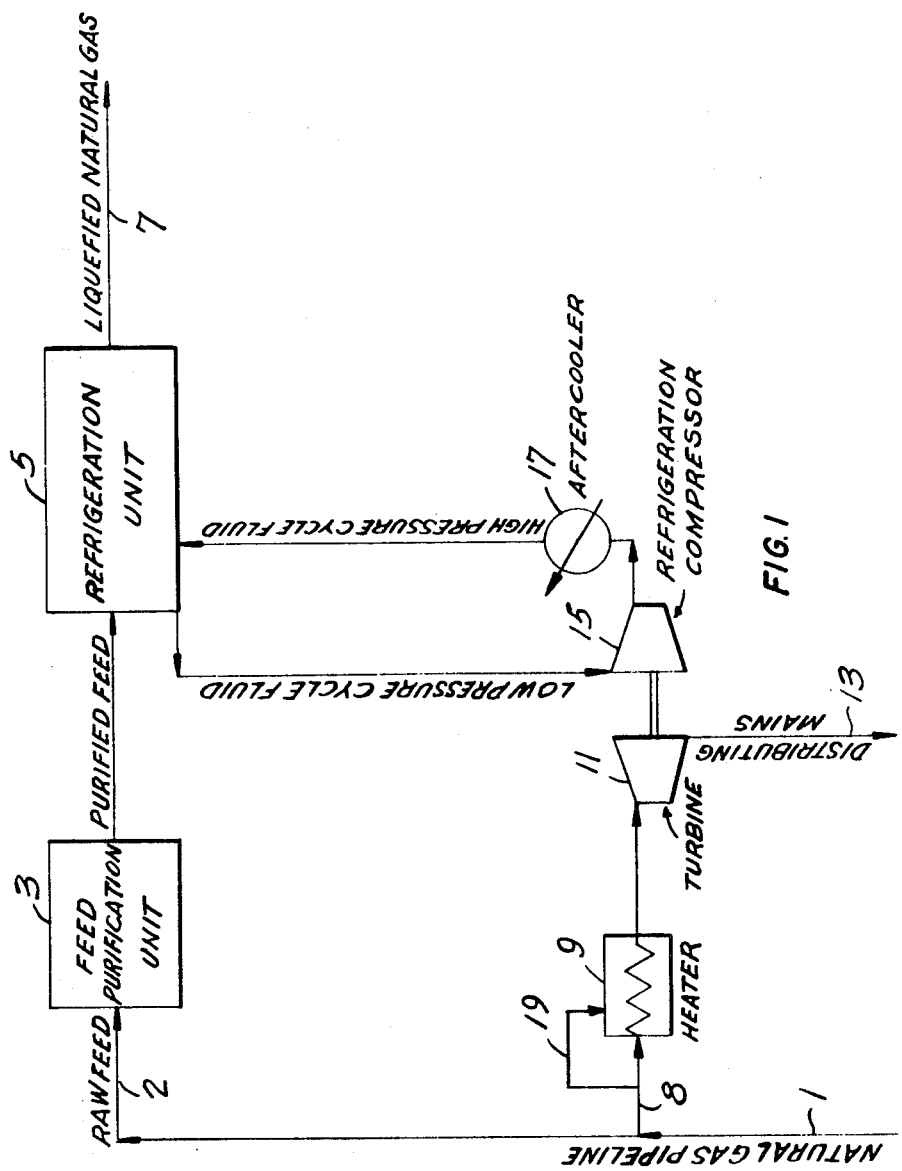
FIG. 1 shows an improved system for liquefying natural gas.

Natural gas is supplied from the main pipe line 1 at high pressure to the distribution and liquefaction system, as shown in FIG. 1. One stream is fed directly through line 2 into a feed purification unit 3 which removes water and carbon dioxide from the gas. The purified gas is fed into a refrigeration unit 5 where it is refrigerated. The gas can be sufficiently refrigerated to liquefy it. The cooled or liquefied gas emerges at outlet 7 and is stored for future use. The flow through line 2 is sufficient to provide the amount of cooled or liquefied gas required.

The remainder of the gas flowing the main pipe line is passed through line 8 to a heater 9 to raise its temperature. The gas, in passing through the heater, takes on added energy. The amount of energy added can be controlled by controlling the temperature of the heater. The heated gas is then passed through an expansion turbine 11 where it expands to a low pressure and then passes to a low pressure distributing main 13. The expansion of the heated gas in the turbine from a high pressure to low pressure produces power to drive a refrigeration compressor 15 connected to the turbine. The refrigeration compressor recirculates a refrigerant medium through an aftercooler 17 to the refrigeration unit 5 and back again in a closed cycle, as shown in FIG. 1. The refrigerant cools or liquefies the natural gas passing through the refrigeration unit. The refrigeration cycle is preferably an auto-refrigerated cascade cycle as described in U.S. Pat. 3,218,816, issued Nov. 23, 1965 to L'Air Liquide. Preferably, the refrigerant used in the refrigeration cycle consists of a single mixture of a composition such that its progressive condensation supplies the necessary refrigeration at the required temperature levels in cascade in passing through the refrigeration unit. Partial condensation of the refrigerant takes place at one pressure level corresponding to the high pressure cycle, while vaporization occurs at a single low pressure corresponding to the cycle compressor suction pressure.

The heater 9 preferably is a direct fired gas heater utilizing part of the gas flow from the main supply line supplied through line 19. The heater can be variably controlled to raise the temperature of the gas passing through it to the level required to produce the required amount of refrigeration.

Should the power developed in the expansion turbine as a result of expanding the heated gas be insufficient by itself to provide the necessary refrigeration, additional power to operate the refrigeration compressor may be supplied from an outside source, such as an electric motor.

Figure 2:
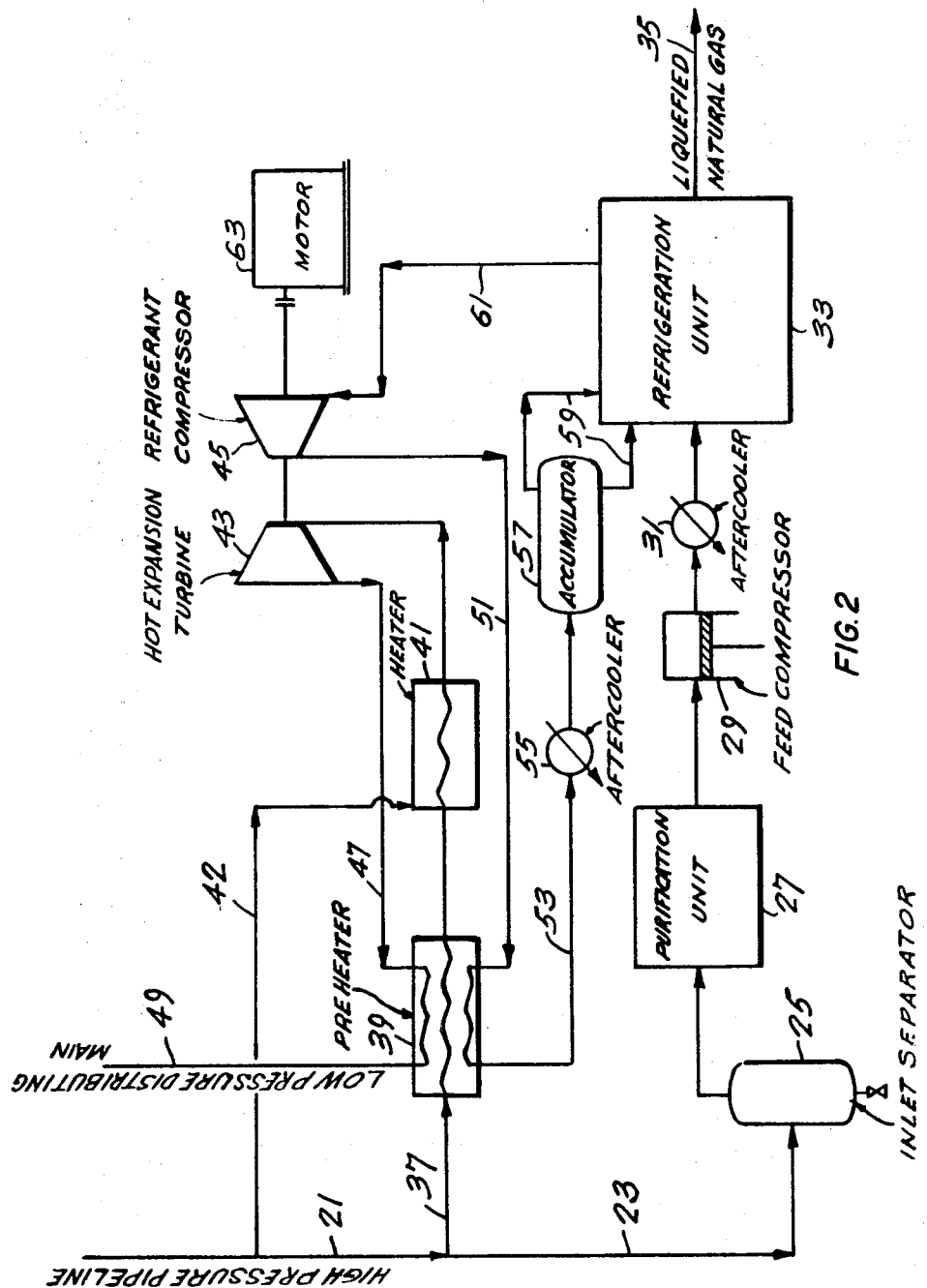
FIG. 2 illustrates another embodiment of the invention.

A preferred embodiment of the invention is shown in FIG. 2 of the drawings. The natural gas flowing in the high pressure pipe line 21 is divided into two streams. One stream 23 consists of natural gas which is to be cooled or liquefied. This gas is fed through an inlet separator 25 to a purification unit 27 where water and carbon dioxide are removed from the gas. After purification, the gas stream is compressed in a feed compressor 29 and then passes, through an aftercooler 31, to the refrigeration unit 33 where it is cooled or liquefied by heat exchange with a refrigeration medium. The cooled or liquefied gas emerges from the refrigeration unit through line 35 to be stored for future use.

The other gas stream passes from the pipe line 21 through line 37 to a preheater 39 where its temperature is raised. The preheater acts as a heat exchanger and heats the gas initially by passing it in heat exchange relation with exhaust gas from the turbine and with the refrigeration medium emerging from the compressor. From the preheater the gas is then fed to a direct fired gas heater 41 where its temperature is further raised. The heater 41 is fed by gas from the main supply line through line 42. From the heater 41 the hot gas is expanded through the turbine 43. The power developed during the expansion is used to drive the refrigeration compressor 45 connected to the turbine to circulate the refrigerator medium used to cool or liquefy the gas within the refrigeration unit 31. The refrigeration cycle is again preferably of the auto-refrigerated cascade type described in previously mentioned U.S. Pat. 3,218,816. The expanded gas discharged from the expansion turbine 43 still has sufficient heat which can be utilized by passing it, through a line 47, to the preheater 39 to heat the gas entering the preheater from line 21. The expanded gas is then passed from the preheater to the low pressure distributing main 49.

The heat of compression of the refrigeration medium is partially recovered by passing it through line 51 through preheater 39 where heat is given up to the high pressure gas. After the preheater, the refrigerant medium passes through line 53 to an aftercooler 55 and then to an accumulator 57. The refirgerant medium is partially condensed in the aftercooler. From the accumulator, the refrigeration medium passes through lines 59 to the refrigeration unit to cool or liquefy the gas passing therethrough. From the refrigeration unit, the refrigerant medium is passed back through line 61 to the refrigerant compressor to begin the cycle anew.

If the power supplied by the expansion turbine is not sufficient to provide the necessary refrigeration, added power may be obtained by use of a motor 63 to help drive the refrigerant compressor 45.

In an example of operation of the system used to liquefy natural gas, a gas flow through the pipe line 21 at the rate of 45 MM s.c.f.d., at a pressure of 180 p.s.i.g., is divided into two streams. The stream of gas to be liquefied passing through line 23 is equal in flow to 5 MM s.c.f.d. The second gas stream through line 37 has a flow of 40 MM s.c.f.d. The second gas stream, in passing through preheater 39 has its temperature raised from 60° F. to 200° F. by heat exchange with the compressed refrigeration medium having a temperature of about 240° F. and the hot gas discharged from the expansion turbine which has a temperature of about 130° F. The preheated gas stream then passes to a direct fired gas heater where it is further heated to a temperature of 300° F. The gas heater uses 0.06 MM s.c.f.d. of gas. With the gas at this temperature and when expanded in the expansion turbine from 180 p.s.i.g. to 15 p.s.i.g., sufficient power is developed to liquefy the 5 MM s.c.f.d. of gas flowing through the refrigeration unit. When liquefied, the gas is sent to storage at a temperature of −260° F.

Should the flow of natural gas in the high pressure pipe line drop so that only 30 million standard cubic feet per day of gas is passed through the heater, the power required to maintain a liquefaction rate of 5 MM s.c.f.d. is obtained by raising the temperature of the gas in the heater to approximately 500° F. However, by so doing, the temperature at the outlet of the turbine is also increased to 350° F., as compared to 130° F. for the previous example, and consequently more heat is recovered in the preheater. This factor, added to the flow reduction to 30 MM s.c.f.d., compensates the increase in gas consumption required in the direct fired gas heater to raise the gas temperature to 500° F. With a gas flow of 30 MM s.c.f.d., the gas consumption in the heater is only raised to 0.15 MM s.c.f.d.

The power requirements of the refrigeration cycle to liquefy any required amount of gas can easily be controlled by controlling the temperature to which the gas is to be heated prior to expansion.

The gas consumption of the entire system is not much higher than with the comparable cold expansion cycle previously used, since the purification unit, which was a major consumer of gas for regeneration heating purposes, is now markedly reduced in size and hence in heating requirements.

The invention need not be limited to the compression arrangement for the gas stream to be cooled or liquefied shown in FIG. 2, since it is perfectly feasible to combine the feed compressor 29 with the refrigeration compressor 45.

The system described can be used in gas separating processes. In processes involving methane separation from natural gas where an excess amount of gas under high pressure is available in the plant, it is possible to make use of the expansion of this excess gas after heating it to provide the power necessary to drive a compressor on a refrigerating service used in separating the gases.

It will be obvious to those skilled in the art that numerous variations and modifications can be made without departing from the invention disclosed.

I claim:

1. The process of reducing the pressure of a high pressure source of natural gas containing at least one freezable constituent such as water or carbon dioxide while utilizing the pressure-energy of the natural gas source and liquefying the natural gas after the water and carbon dioxide have been removed so that it can be readily handled and stored, comprising the steps of:
   (A) diverting a small portion of primary source of natural gas containing at least one impurity to be removed;
   (B) removing the impurity from said diverted portion of gas;
   (C) liquefying by refrigeration the purified portion by means of a refrigerant from an independent closed refrigeration cycle;
   (D) heating the remaining primary source of natural gas to increase the energy-pressure thereof;
   (E) expanding the heated gas to a lower pressure by directing it through power means and making the expanded gas available for consumption-distribution;
   (F) driving a compressor for the independent closed refrigeration circuit by the pressure-energy converted by said power means.

2. The process as set forth in claim 1 comprising: preheating the remaining portion of said portion of said gas, prior to primary heating, by means of the compression cycle of said independent closed refrigeration cycles.

3. A process for distributing a high pressure flow of natural gas while liquefying a portion of the flow of said natural gas which is smaller than said remaining flow, said natural gas containing at least one freezable impurity such as moisture or carbon dioxide, comprising diverting said portion of the flow to be liquefied from said high pressure flow, purifying exclusively said portion of the flow from said impurity, heat exchanging the purified flow with a refrigerant medium passing through an independent closed cycle so as to liquefy said purified flow, heating the remaining flow under high pressure, expanding the heated flow at said high pressure to a distribution low pressure by passing through means producing power, employing said power for compressing said refrigerant medium.

4. A process according to claim 1, comprising heat exchanging said remaining flow, prior to its heating, with the compressed refrigerant medium.

5. An apparatus for distributing a flow of natural gas while liquefying a portion of the flow of said natural gas which is smaller than the remaining flow, said natural gas containing at least one freezable impurity such as moisture or carbon dioxide, comprising means for diverting said flow to be liquefied from the larger remaining flow usder a transportation high pressure, a purification unit for purifying exclusively said smaller flow, an independent refrigeration unit for liquefying said purified smaller flow, a heater for heating said larger flow under said transportation high pressure, an expansion turbine for expanding the heated large flow at said transportation high pressure to a distribution low pressure, said turbine being connected to operate a compressor for circulating a refrigerant medium through the refrigeration unit.

6. An apparatus according to claim 5 comprising a preheater including a conduit for the compressed refrigerant medium, a conduit for said larger flow under said transportation high pressure in heat exchange relationship with said conduit for the compressed refrigerant medium.

References Cited

UNITED STATES PATENTS

| | | | |
|---|---|---|---|
| 2,823,523 | 2/1958 | Eakin | 62—40 |
| 2,880,592 | 4/1959 | Davison | 62—23 |
| 2,909,905 | 10/1959 | Mitchell | 62—40 |
| 3,183,666 | 5/1965 | Jackson | 62—52 |
| 3,266,261 | 8/1966 | Anderson | 62—52 |
| 3,360,945 | 1/1968 | Thornton | 62—23 |

NORMAN YUDKOFF, Primary Examiner

A. F. PURCELL, Assistant Examiner

U.S. Cl. X.R.

62—40